(12) United States Patent
Shimura et al.

(10) Patent No.: US 8,813,725 B2
(45) Date of Patent: Aug. 26, 2014

(54) EVAPORATED FUEL TREATMENT DEVICE FOR VEHICLE

(75) Inventors: Takeshi Shimura, Wako (JP); Ikuo Hara, Wako (JP); Tadaaki Nagata, Wako (JP); Shinji Kobayashi, Wako (JP); Takahiro Imamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 371 days.

(21) Appl. No.: 13/397,418

(22) Filed: Feb. 15, 2012

(65) Prior Publication Data
US 2012/0240904 A1 Sep. 27, 2012

(30) Foreign Application Priority Data
Mar. 23, 2011 (JP) .................................. 2011-064710

(51) Int. Cl.
*F02M 33/02* (2006.01)

(52) U.S. Cl.
USPC ......................................................... 123/519

(58) Field of Classification Search
USPC ........... 123/516, 518, 519, 520, 522; 220/210
See application file for complete search history.

(56) References Cited

U.S. PATENT DOCUMENTS

| | | | |
|---|---|---|---|
| 4,053,083 A * | 10/1977 | Hukuta | 220/202 |
| 4,312,649 A | 1/1982 | Fujii et al. | |
| 4,659,346 A | 4/1987 | Uranishi et al. | |
| 4,754,627 A * | 7/1988 | Butler, III | 70/158 |
| 4,984,698 A * | 1/1991 | Stuckey | 215/207 |
| 5,000,339 A * | 3/1991 | Wheat et al. | 220/203.07 |
| 5,904,057 A | 5/1999 | Abney, III et al. | |
| 6,092,685 A | 7/2000 | Gruber | |
| 6,223,923 B1 * | 5/2001 | Fishman | 220/210 |
| 7,267,112 B2 * | 9/2007 | Donahue et al. | 123/518 |
| 7,677,277 B2 | 3/2010 | Thompson et al. | |
| 8,100,297 B1 * | 1/2012 | Anish et al. | 222/153.03 |
| 2012/0255525 A1 * | 10/2012 | Shimura et al. | 123/519 |

FOREIGN PATENT DOCUMENTS

JP 2004-156496 A 6/2004

* cited by examiner

*Primary Examiner* — Hai Huynh
(74) *Attorney, Agent, or Firm* — Birch, Stewart, Kolasch & Birch, LLP

(57) ABSTRACT

An evaporated fuel treatment device for a vehicle is provided to suppress the flowout of evaporated fuel into atmospheric air. In the evaporated fuel treatment device, a communication chamber is formed in a fuel supply cap, allowing communication between a charge passage and the inside of a fuel tank in a closed state. In the communication chamber, a positive pressure adjusting valve is openable to supply evaporated fuel in the fuel tank to an evaporated fuel storage unit through the communication chamber and the charge passage, and a negative pressure adjusting valve is openable to supply atmospheric air to the fuel tank from the evaporated fuel storage unit through the communication chamber and the charge passage. An interlocking member is provided between the key cover and the negative pressure adjusting valve, and opens the negative pressure adjusting valve in an interlocking manner with an operation of opening the key cover.

18 Claims, 6 Drawing Sheets

EVAPORATED FUEL TREATMENT DEVICE FOR VEHICLE

CROSS-REFERENCE TO RELATED APPLICATIONS

This nonprovisional application claims priority under 35 U.S.C. §119(a) on Patent Application No. 2011-064710, filed in Japan on Mar. 23, 2011, the entirety of which is incorporated herein by reference.

BACKGROUND OF THE INVENTION

1. Field of the Invention

The present invention relates to an evaporated fuel treatment device for a vehicle, and more particularly to an evaporated fuel treatment device for a vehicle which introduces an evaporated fuel generated in the inside of a fuel tank to the outside of the fuel tank.

2. Background of the Invention

JP-A-2004-156496 discloses a system which, in an evaporated fuel treatment device for a vehicle provided with a closed-type fuel tank, controls a tank inner pressure by electronic control for preventing the flowout of evaporated fuel or fuel to the outside of the tank from a fuel filling port at the time of filling fuel, when the tank inner pressure is high.

Although the system disclosed in JP-A-2004-156496 can be preferably used in a relatively large-sized four-wheeled vehicle or the like, it is difficult to use the system in a motorcycle or the like where a space is small, a device cost is required to be low, and opening/closing of a fuel filling port is directly carried out by a key manipulation.

SUMMARY OF THE INVENTION

It is an object of the present invention to provide an evaporated fuel treatment device for a vehicle that can suppress the flowout of evaporated fuel into atmospheric air with a simple structure and can be preferably used in a miniaturized/small vehicle.

To achieve the above-mentioned object, according to a first aspect of the present invention, To achieve the above-mentioned object, according to a first aspect of the present invention, An evaporated fuel treatment device for a vehicle comprises a fuel tank for storing fuel; a fuel supply cap mounted on a fuel filling port of the fuel tank, the fuel supply cap being openable from and closeable to the fuel filling port by manipulation with a key inserted into a key cylinder; a key cover mounted on the fuel supply cap and covering a key hole of the key cylinder in an openable and closeable manner; an evaporated fuel storage unit storing evaporated fuel using an absorption agent; a charge passage allowing communication between the fuel tank and the evaporated fuel storage unit; a purge passage allowing communication between the evaporated fuel storage unit and an intake system of an internal combustion engine; a communication chamber formed under the fuel supply cap, the communication chamber allowing communication between the charge passage and an inside of the fuel tank, an open/close valve arranged in the communication chamber, the open/close valve being opened when an inner pressure in the fuel tank reaches a predetermined pressure such that the fuel tank and the evaporated fuel storage unit communicate with each other, and an interlocking member located between the key cover and the open/close valve, the interlocking member opening the open/close valve in an interlocking manner with an operation to open the key cover.

Furthermore, according to a second aspect of the present invention, the open/close valve includes a positive pressure adjusting valve, the positive pressure adjusting valve being opened when the inner pressure in the fuel tank becomes a first predetermined pressure or higher such that the evaporated fuel generated in the fuel tank is supplied to the evaporated fuel storage unit through the communication chamber and the charge passage; and a negative pressure adjusting valve, the negative pressure adjusting valve being opened when the inner pressure in the fuel tank becomes a second predetermined pressure or lower such that atmospheric air is supplied to the fuel tank from the evaporated fuel storage unit through the communication chamber and the charge passage, wherein the interlocking member is interlocked with either the positive pressure adjusting valve or the negative pressure adjusting valve.

Furthermore, according to a third aspect of the present invention, the key cover includes a proximal portion mounted on the fuel supply cap by a hinge in an openable/closeable manner; and a pushing portion formed on the proximal portion, the pushing portion pushing down the interlocking member when the key cover is opened so as to open the negative pressure adjusting valve.

Furthermore, according to a fourth aspect of the present invention, the interlocking member includes a pushing plate arranged directly below the pushing portion and having resiliency; and an elastic sheet located below the pushing plate, wherein the negative pressure adjusting valve is brought into contact with the elastic sheet.

Furthermore, according to a fifth aspect of the present invention, the key cylinder is arranged at a center portion of the fuel supply cap, the positive pressure adjusting valve and the negative pressure adjusting valve are arranged parallel to each other along a circumference outside the key cylinder and in the radial direction of the key cylinder, the hinge mounted on the key cover extends over the positive pressure adjusting valve and the negative pressure adjusting valve, and the pushing portion is arranged only above the negative pressure adjusting valve and is not arranged above the positive pressure adjusting valve.

Furthermore, according to a sixth aspect of the present invention, a key manipulation standby mechanism is arranged inside of the communication chamber, and the key manipulation standby mechanism detects a pressure difference between the inside and an outside the fuel tank and inhibits key manipulation of the key cylinder when the inner pressure of the fuel tank is higher than atmospheric pressure.

According to the first aspect of the present invention, the open/close valve is opened in an interlocking manner with an operation to open the key cover of the key cylinder at the time of opening the fuel supply cap so that an inner pressure in the fuel tank can be released to an evaporated fuel storage unit side before the fuel supply cap is opened. Accordingly, it is possible to suppress the flowout of evaporated fuel into atmospheric air caused by the inner pressure in the fuel tank when the fuel supply cap is opened. Further, the flowout of the evaporated fuel into atmospheric air can be prevented with this simple structure which makes use of an operation to open the key cover. Therefore, the evaporated fuel treatment device exhibits excellent convenience and is preferably applicable to a miniaturized/small vehicle.

According to the second aspect of the present invention, during traveling or the like, the fuel tank can be maintained in a sealed state by the positive pressure adjusting valve and the negative pressure adjusting valve until the fuel tank reaches a predetermined pressure. Therefore, an amount of evaporated fuel fed to the evaporated fuel storage unit can be reduced.

According to the third aspect of the present invention, pressure in the fuel tank can be released by making use of a normal operation at the time of supplying fuel (before opening the fuel supply cap) with the simple structure, thereby suppressing the flowout of evaporated fuel in the fuel tank to the outside of the fuel tank.

According to the fourth aspect of the present invention, a role of a plate spring which gives a biasing force to the rotation of the key cover is imparted to the pushing plate so that air tightness can be ensured by the elastic sheet thus constituting a mechanism for releasing pressure in the fuel tank in a compact shape while maintaining favorable open/close manipulability of the key cover.

According to the fifth aspect of the present invention, by arranging the pushing portion only above the negative pressure adjusting valve, pressure in the fuel tank can be released while ensuring an appropriate biasing force applied to the key cover.

According to the sixth aspect of the present invention, by allowing a key manipulation when pressure in the fuel tank is sufficiently lowered, the flowout of evaporated fuel into atmospheric air can be suppressed with certainty.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
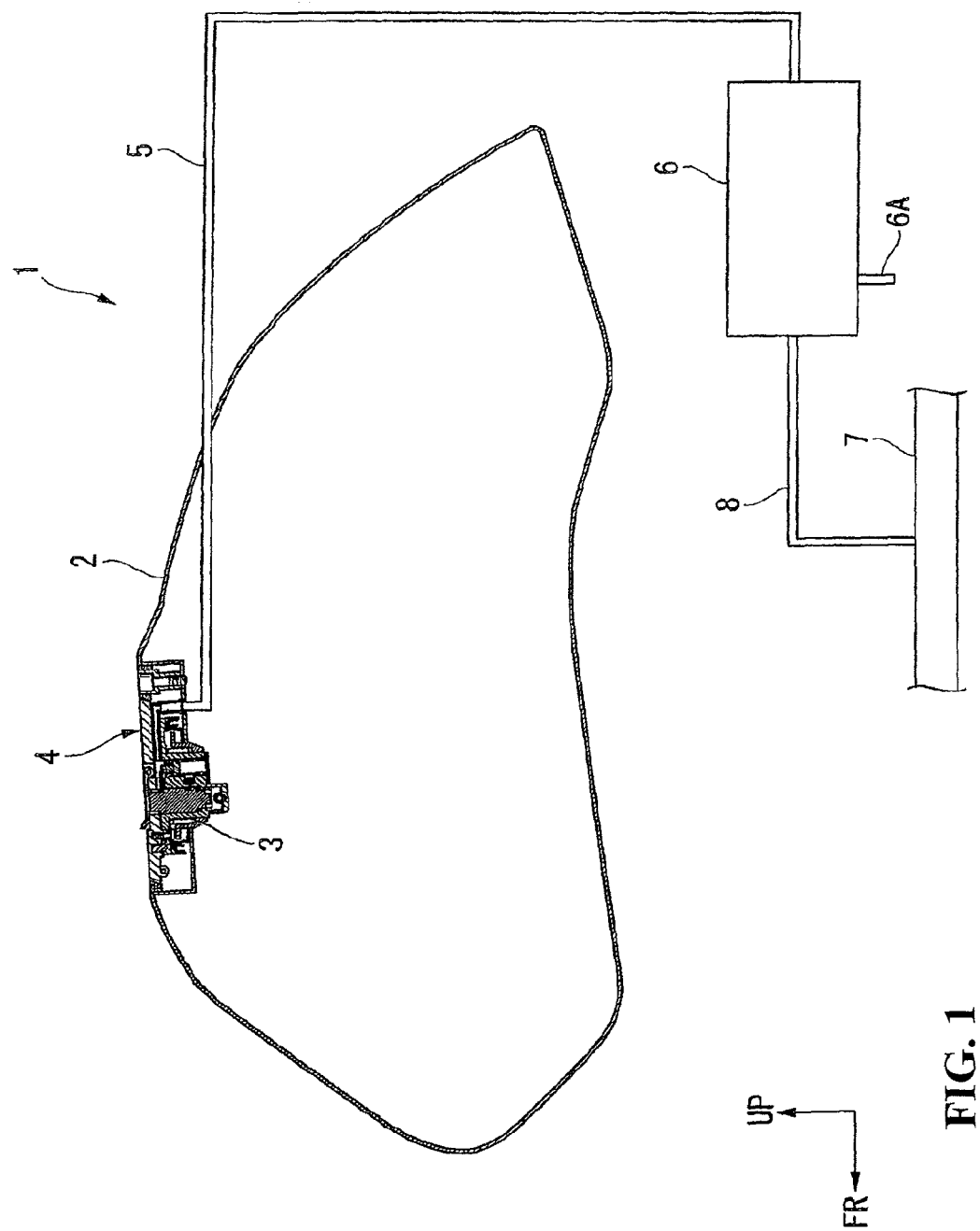
FIG. 1 is a view showing the schematic constitution of an evaporated fuel treatment device according to a first embodiment of the present invention.

The present invention will now be described in detail with reference to the accompanying drawings, wherein the same reference numerals will be used to identify the same or similar elements throughout the several views. It should be noted that the drawings should be viewed in the direction of orientation of the reference numerals.

First Embodiment

FIG. 1 shows a schematic constitution of an evaporated fuel treatment device 1 according to a first embodiment of the present invention, which is applied to a fuel tank of a motorcycle. The evaporated fuel treatment device 1 includes a fuel tank 2, a fuel supply cap 4 mounted on a fuel filling port 3 of the fuel tank 2 in an openable/closeable manner, a charge pipe 5 penetrating the fuel tank 2 and connected to the fuel supply cap 4, an evaporated fuel storage unit 6 connected to the charge pipe 5 outside the fuel tank 2, and a purge pipe 8 allowing the evaporated fuel storage unit 6 and a connecting tube 7 which is a member constituting an intake system to be communicated with each other. A drain pipe 6A through which atmospheric air is sucked is mounted on the evaporated fuel storage unit 6.

Figure 2:
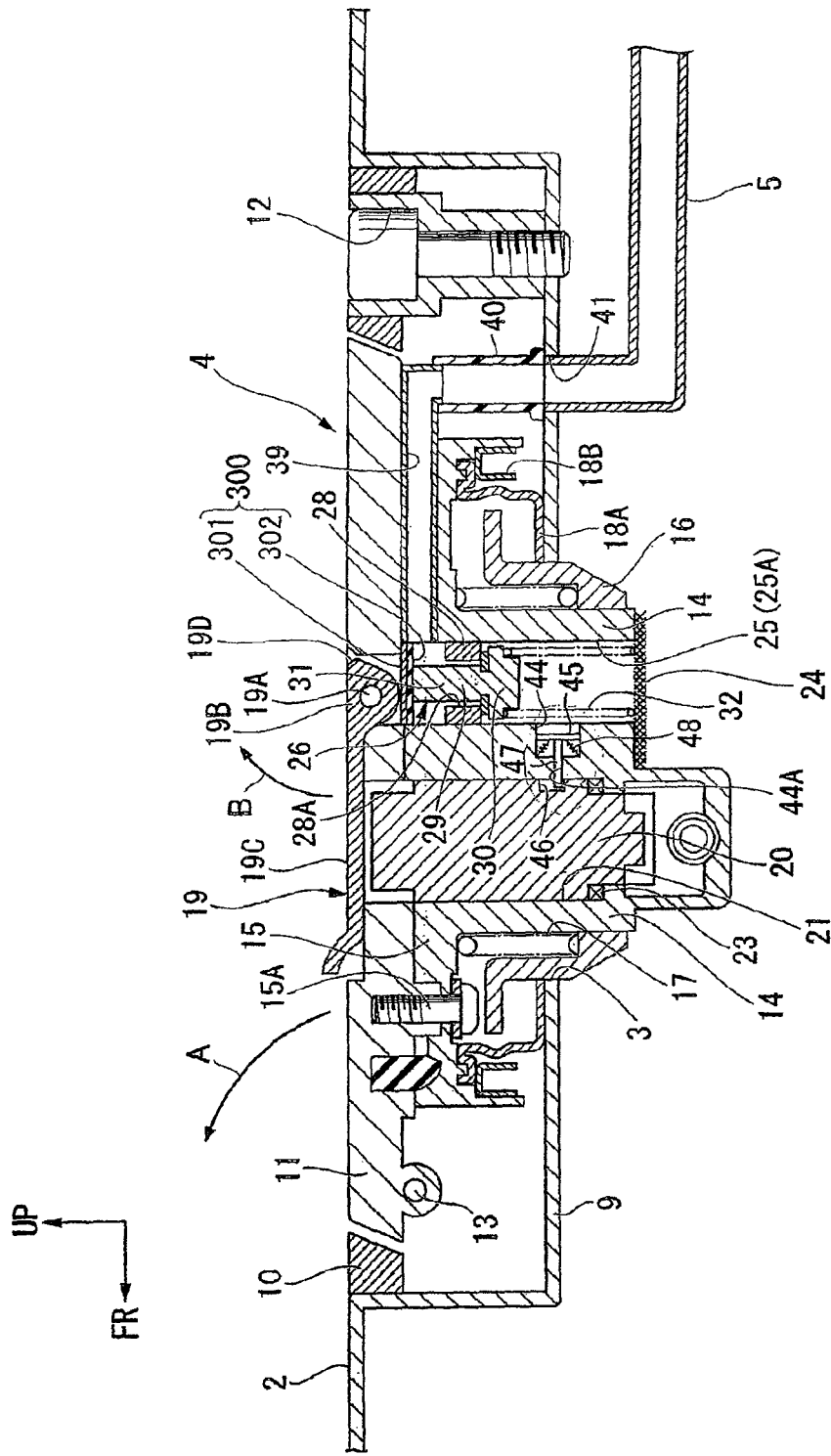
FIG. 2 is a cross-sectional view of a fuel supply cap of the evaporated fuel treatment device according to the first embodiment of the present invention.

As shown in FIG. 2, a seat portion 9 having a recessed shape (as viewed in cross section) which is indented by being bent from an upper outer wall is mounted on the fuel tank 2, and the fuel filling port 3 has a circular shape as viewed in a plan view (i.e., the top plan view) and is formed on an approximately center region of the seat portion 9. The charge pipe 5 is communicated with the inside of the fuel tank 2 through the fuel supply cap 4 and feeds evaporated fuel generated in the inside of the fuel tank 2 to the evaporated fuel storage unit 6 (see FIG. 1). The evaporated fuel storage unit 6 contains an absorption agent therein, and stores evaporated fuel fed from the charge pipe 5 by absorption.

The fuel supply cap 4 includes a circular annular outer frame portion 10 fixed to the seat portion 9 and a cap body 11 arranged inside the outer frame portion 10. In addition, a plurality of sunk holes 12 are formed in the outer frame portion 10. The fuel supply cap 4 is fixed to the seat portion 9 by inserting bolts into the sunk holes 12 formed in the outer frame portion 10. The cap body 11 is connected to the outer frame portion 10 by a hinge 13, and is rotatably openable and closeable in the direction indicated by an arrow A in FIG. 2.

A cylindrical tumbler 14 is mounted on a lower surface of the cap body 11. The tumbler 14 includes a flange portion 15 on an upper end periphery thereof as an integral part thereof, and the tumbler 14 is fixed to the lower surface of the cap body 11 by a plurality of screws 15A which penetrate the flange portion 15. A sealing member 16 made of a resin material is fitted on the tumbler 14 in a state where the sealing member 16 is brought into pressure and physical contact with an inner peripheral surface of the fuel filling port 3. The sealing member 16 is downwardly biased by a spring 17 which has one end brought into contact with an inner peripheral side of the flange portion 15 of the tumbler 14.

An upper end portion of the sealing member 16 is bent in the outer peripheral direction, and the bent portion is brought into contact with a restricting member 18A which extends downwardly from an outer peripheral side of the flange portion 15 of the tumbler 14. Therefore, the position of the sealing member 16 is restricted. As shown in FIG. 2, a fixing member 18B is used for fixing the restricting member 18A.

A key cover 19 is rotatably opened or closed in the direction indicated by an arrow B in FIG. 2, and is connected to an upper portion of the cap body 11 by a hinge shaft 19A. The key cover 19 exposes a key cylinder 20 to the outside. The key cylinder 20 is housed in a cylinder chamber 21 formed in the inside of the tumbler 14, and a key hole of the key cylinder 20 faces upwardly. The key cover 19 is constituted of a proximal portion 19B connected to the hinge shaft 19A, and a cover body 19C integrally formed with the proximal portion 19B and covering the key hole of the key cylinder 20.

When a key is inserted and is rotated, the key cylinder 20 releases a lock state of the cap body 11. More specifically, the key cylinder 20 includes an engaging member (not shown) which advances or retracts in the radial direction of the key cylinder 20 corresponding to the rotation of the key, and the release of the cap body 11 is restricted by engaging the engaging member with a stopper portion (not shown) mounted on the fuel tank 2.

A communication chamber 25 extends parallel to the cylinder chamber 21 and is formed in the tumbler 14 on a side of the cylinder chamber 21. A lower end portion of the communication chamber 25 opens inside the fuel tank 2, and is covered with a mesh-like filter member 24, for example, through which evaporated fuel and fuel in a liquid form can pass. An upper end portion of the communication chamber 25 is covered with air tightness with an interlocking member 300. The interlocking member 300 is constituted of a pushing plate 301 made of a resilient metal material which is arranged directly below the proximal portion 19B of the key cover 19, and an elastic sheet 302 made of a resin material. The pushing plate 301 and the elastic sheet 302 are mounted on the cap body 11 in a state where the pushing plate 301 and the elastic sheet 302 close a hole which penetrates the cap body 11 below the proximal portion 19B of the key cover 19.

Figure 3:
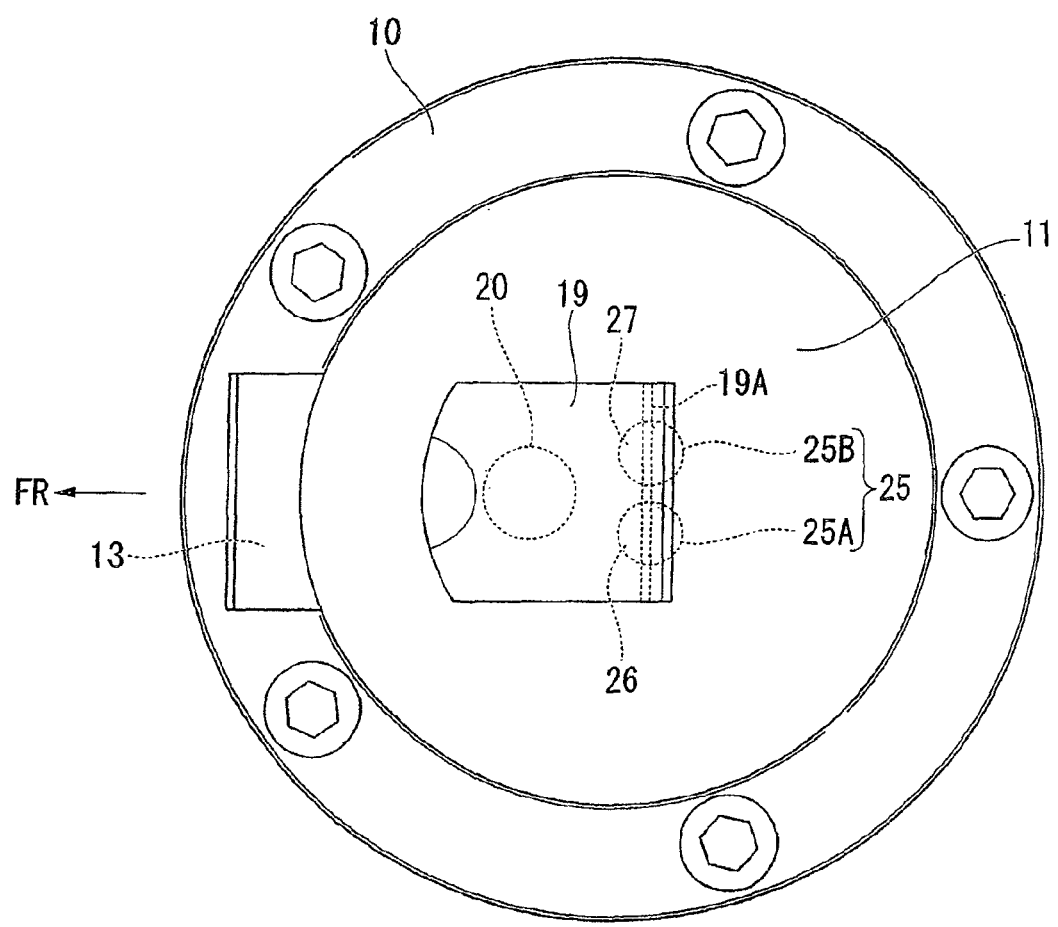
FIG. 3 is a top plan view of the fuel supply cap of the evaporated fuel treatment device according to the first embodiment of the present invention.

To explain the embodiment in conjunction with FIG. 3, the communication chamber 25 is formed of a pair of neighboring cylindrical portions 25A, 25B. The communication chamber 25 is formed in the tumbler 14 by boring, a negative pressure adjusting valve 26 is arranged in the cylindrical portion 25A, and a positive pressure adjusting valve 27 is arranged in the cylindrical portion 25B. The communication chamber 25 is separated into a fuel tank 2 inner side on a lower side of the communication chamber 25 and a fuel tank 2 outer side on an upper side communication chamber 25 by the negative pressure adjusting valve 26 and the positive pressure adjusting valve 27. The negative pressure adjusting valve 26 is biased from the fuel tank 2 inner side with a predetermined biasing force, and is opened when an inner pressure in the fuel tank 2 becomes a predetermined pressure or lower. The positive pressure adjusting valve 27 is biased from the fuel tank 2 outer side with a predetermined biasing force, and is opened when the inner pressure in the fuel tank 2 becomes a predetermined pressure or higher. The negative pressure adjusting valve 26 and the positive pressure adjusting valve 27 are arranged on a side opposite to the hinge 13 with respect to the key cylinder 20. The negative pressure adjusting valve 26 and the positive pressure adjusting valve 27 are arranged parallel to each other in the radial direction of the key cylinder 20.

As shown in FIG. 2, the negative pressure adjusting valve 26 is constituted of: a valve seat 28 formed in a radially inwardly projecting manner from an inner peripheral surface of the cylindrical portion 25A and having a hole portion 28A; a valve element 31 having a shaft portion 29 which is fitted into and is inserted into the hole portion 28A of the valve seat 28 and an umbrella portion 30 which is joined to a lower end of the shaft portion 29 and is brought into contact with the valve seat 28 from the inside of the fuel tank 2; and a spring 32 having one end thereof brought into contact with the filter member 24 and the other end thereof brought into contact with the umbrella portion 30 of the valve element 31 thus biasing the valve element 31. The spring 32 is arranged in a shrunken state between the filter member 24 and the valve element 31 so as to impart a predetermined biasing force to the valve element 31.

Figure 4:
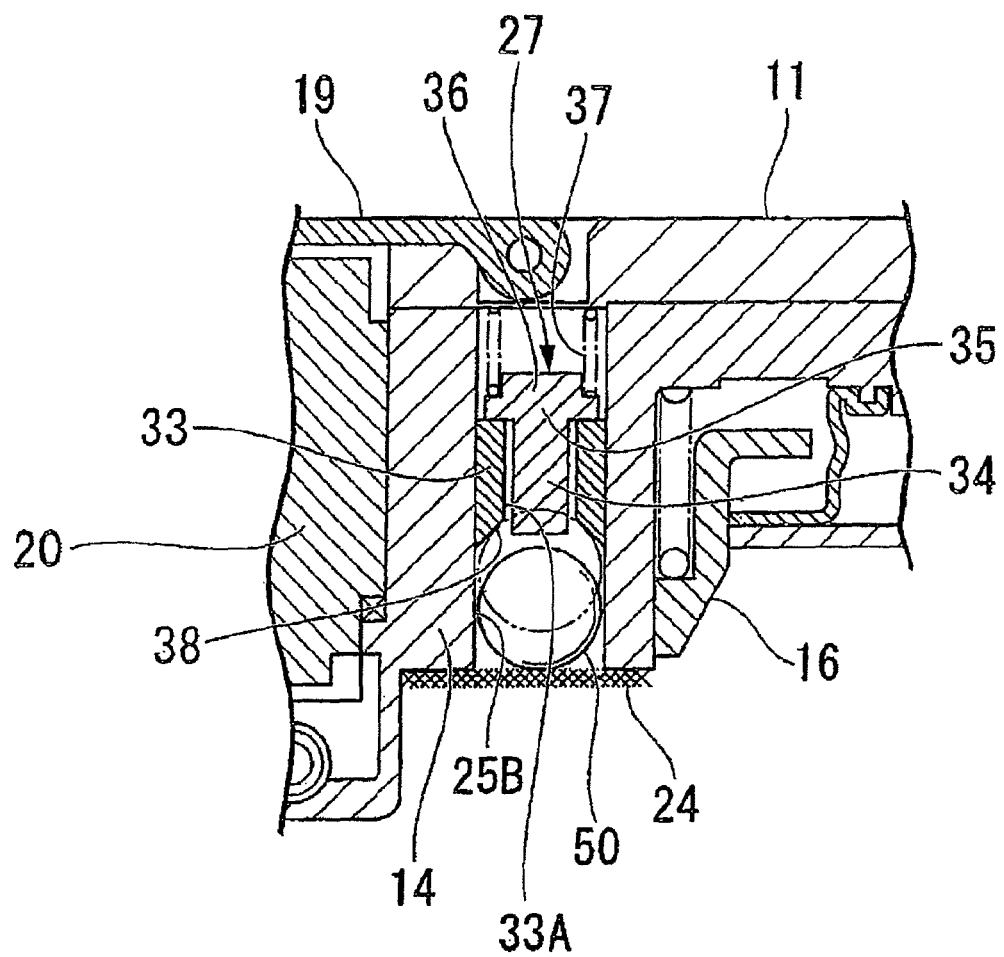
FIG. 4 is a cross-sectional view of a positive pressure adjusting valve and an area around the positive pressure adjusting valve mounted on the fuel supply cap of the evaporated fuel treatment device according to the first embodiment of the present invention.

On the other hand, as shown in FIG. 4, the positive pressure adjusting valve 27 is constituted of: a valve seat 33 formed in a radially inwardly projecting manner from an inner peripheral surface of the cylindrical portion 25B and having a hole portion 33A; a valve element 36 having a shaft portion 34 which is inserted into the hole portion 33A of the valve seat 33 and an umbrella portion 35 which is joined to an upper end of the shaft portion 34 and is brought into contact with the valve seat 33 from the outside of the fuel tank 2; and a spring 37 having one end thereof brought into contact with a lower surface of the cap body 11 and the other end thereof brought into contact with the umbrella portion 35 of the valve element 36 thus biasing the valve element 36. In a closed state where the umbrella portion 35 is brought into contact with the valve seat 33, the shaft portion 34 projects downwardly from the valve seat 33 when the positive pressure adjusting valve 27 is in a closed state. The spring 37 is arranged in a shrunken state between the cap body 11 and the valve element 36 so as to impart a predetermined biasing force to the valve element 36.

An inclined portion 38 which gradually enlarges (increases) an inner diameter of the hole portion 33A in the downward direction is integrally formed with a lower portion of the valve seat 33, and a spherical rollover valve 50 freely movable between the valve seat 33 and the filter member 24 is housed in the cylindrical portion 25B below the valve seat 33. A diametric size (diameter) of the rollover valve 50 is set slightly smaller than a diametric size of the cylindrical portion 25B such that evaporated fuel passes. The rollover valve 50 is also pushed by fuel which intrudes into the cylindrical portion 25B when the fuel tank 2 is inclined at a predetermined angle or more so that the rollover valve 50 pushes up the shaft portion 29 of the positive pressure adjusting valve 27 thus closing the valve seat 33 (inclined portion 38) so as to prevent the flowout of fuel. Since the rollover valve 50 is brought into contact with the inclined portion 38, the close contact property of both elements is enhanced.

To explain this embodiment in conjunction with FIG. 2, upper end portions of the cylindrical portions 25A, 25B are closed by the lower surface of the cap body 11. On the other hand, upper spaces of the cylindrical portions 25A, 25B separated from the inside of the fuel tank 2 by the negative pressure adjusting valve 26 and the positive pressure adjusting valve 27 are communicated with each other, and a cap inner charge passage 39 extending in the radial direction of the flange portion 15 from an inner peripheral surface of an upper portion of the cylindrical portion 25A is formed. The cap inner charge passage 39 penetrates the inside of the flange portion 15, and opens downwardly in a space formed between the cap body 11 and the seat portion 9.

A cylindrical elastic member 40 having a cylindrical shape is hermetically joined to the downwardly directed opening of the cap inner charge passage 39. A lower end portion of the cylindrical elastic member 40 is brought into close contact with the seat portion 9 in a state where the cap body 11 is closed, and covers a communication opening 41 formed in the seat portion 9. The communication opening 41 is a hole which penetrates into the inside of the fuel tank 2 from the seat portion 9, and is hermetically connected to the charge pipe 5 arranged in the inside of the fuel tank 2. Due to such a constitution, a passage extending from the inside of the fuel tank 2 to the evaporated fuel storage unit 6 is formed.

An upper end of the shaft portion 29 of the negative pressure adjusting valve 26 is brought into contact with the elastic sheet 302. The proximal portion 19B of the key cover 19 is positioned above the pushing plate 301 and the elastic sheet 302 and has a cam shape, and the proximal portion 19B includes a pushing portion 19D projecting radially outwardly as an integral part thereof. The pushing plate 301 and the elastic sheet 302 are positioned on a rotary trajectory about a hinge shaft 19A of the pushing portion 19D, and when the key cover 19 is opened, the pushing portion 19D is displaced downwardly and pushes the pushing plate 301 and the elastic sheet 302 so that the valve element 31 is lowered. By opening the negative pressure adjusting valve 26 in an interlocking manner with an opening operation of the key cover 19 in this manner, a passage ranging from the inside of the fuel tank 2 to the evaporated fuel storage unit 6 is brought into a communicable state (see FIG. 5).

Since the above-mentioned pushing plate 301 has resiliency, the pushing plate 301 imparts a biasing force to the key cover 19 (in the closing direction) thus enhancing open/close manipulability of the key cover 19. As shown in FIG. 3, the hinge shaft 19A of the key cover 19 is arranged to extend over the positive pressure adjusting valve 27 and the negative pressure adjusting valve 26, and the pushing portion 19D of the proximal portion 19B is arranged only above the negative pressure adjusting valve 26 (see also FIGS. 2 and 4, where the pushing portion 19D is arranged only above the negative pressure adjusting valve 26 but not above the positive pressure adjusting valve 27). By arranging the pushing portion 19D only above the negative pressure adjusting valve 26, it is possible to ensure an appropriate biasing force applied to the key cover 19.

As shown in FIG. 2, a diaphragm chamber 44, which allows a lower portion of the cylinder chamber 21 and a lower portion of the communication chamber 25 to be communicated with each other, is formed in the tumbler 14. The diaphragm chamber 44 is formed such that the diaphragm chamber 44 is indented toward a key cylinder 20 side from a fuel tank 2 inner side of the cylindrical portion 25A partitioned by the negative pressure adjusting valve 26, and the diaphragm chamber 44 has a communication passage 44A penetrating into the cylinder chamber 21 so that the diaphragm chamber 44 is communicated with the cylinder chamber 21. A diaphragm 45 is arranged in the inside of the diaphragm chamber 44, and a cylinder chamber 21 side of the diaphragm chamber 44 is separated from the inside of the fuel tank 2 by gas-phase separation with the diaphragm 45 sandwiched therebetween.

An engaging groove 46 having a recessed shape is formed on an outer peripheral surface of the key cylinder 20 in the inside of the cylinder chamber 21 on the extension of the communication chamber 44A, and an engaging pin 47 engageable with the engaging groove 46 is joined to the diaphragm 45. In the inside of the diaphragm chamber 44 on a communication passage 44A side, a biasing member 48 is housed. The biasing member 48 biases the diaphragm 45 in the direction, along which the engagement of the engaging pin 47 with the engaging groove 46 is prevented against an inner pressure in the fuel tank 2. Due to such a constitution, the diaphragm 45 compresses the biasing member 48 when the inner pressure in the fuel tank 2 is high so that the engaging pin 47 is engaged with the engaging groove 46, thereby restricting the rotation of the key cylinder 20. On the other hand, in the case where an inner pressure in the fuel tank 2 is leveled to the atmospheric pressure, the diaphragm 45 is biased by the biasing member 48 such that the engagement of the engaging pin 47 with the engaging groove 46 is released, thereby allowing the rotation of the key cylinder 20.

In the embodied evaporated fuel treatment device 1, when an inner pressure in the fuel tank 2 becomes a predetermined pressure or lower so that the negative pressure adjusting valve 26 is opened, the fuel tank 2 and the charge pipe 5 are communicated with each other through the fuel supply cap 4. Therefore, the atmospheric air can be fed to the fuel tank 2 from the evaporated fuel storage unit 6 through the charge pipe 5. On the other hand, when an inner pressure in the fuel tank 2 becomes a predetermined pressure or higher, by opening the positive pressure adjusting valve 27, the fuel tank 2 and the charge pipe 5 are communicated with each other through the fuel supply cap 4. Therefore, evaporated fuel generated in the fuel tank 2 can be fed to the evaporated fuel storage unit 6 through the charge pipe 5.

Figure 5:
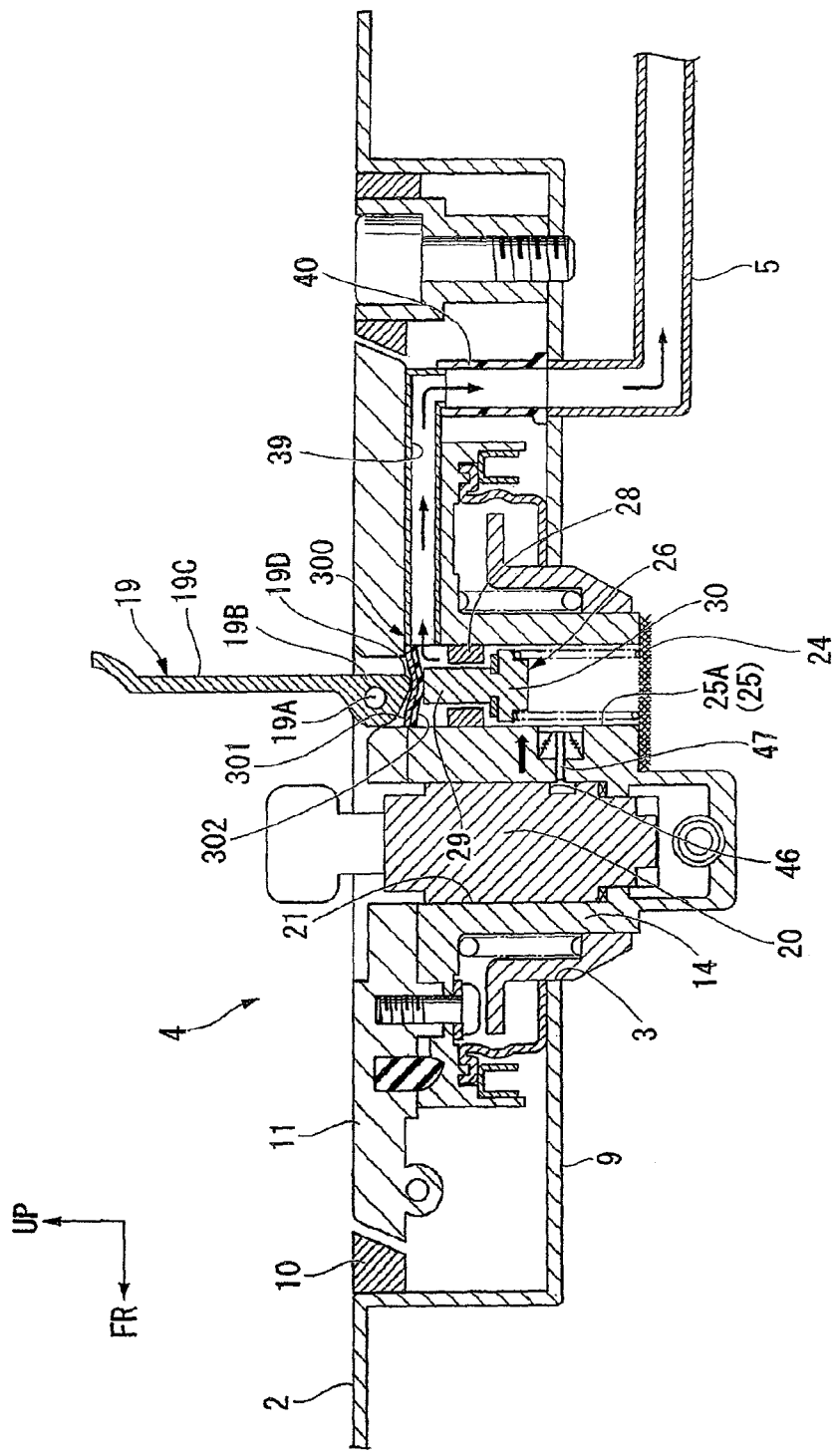
FIG. 5 is a view for explaining the manner of operation of the evaporated fuel treatment device according to the first embodiment of the present invention.

To explain this embodiment in conjunction with FIG. 5, in the case where the key cover 19 is opened, when the proximal portion 19B (pushing portion 19D) of the key cover 19 pushes the pushing plate 301 and the elastic sheet 302 of the interlocking member 300, the valve element 31 of the negative pressure adjusting valve 26 is pushed down so that the negative pressure adjusting valve 26 is opened. When the negative pressure adjusting valve 26 is opened in this manner, as referenced by an arrow in FIG. 5, inner pressure in the fuel tank 2 is released to the evaporated fuel storage unit 6 side through the cylindrical portion 25A, the cap inner charge passage 39, the cylindrical elastic member 40 and the charge pipe 5. When the inner pressure in the fuel tank 2 is lowered, the engaging pin 47 is moved in the direction indicated by an arrow in FIG. 5 so that the engagement of the engaging pin 47 with the engaging groove 46 is released thus allowing the rotation of the key cylinder 20 so that the fuel supply cap 4 can be opened. As shown in FIG. 5, the key 49 is inserted into the key cylinder 20.

As has been explained above, in the evaporated fuel treatment device 1 according to this embodiment, the negative pressure adjusting valve 26 is opened in an interlocking manner with the operation to open the key cover 19 of the key cylinder 20 at the time of opening the fuel supply cap 4. Therefore, an inner pressure in the fuel tank 2 can be released to the evaporated fuel storage unit 6 side before the fuel supply cap 4 is opened. Accordingly, it is possible to suppress the flowout of evaporated fuel into atmospheric air caused by the inner pressure in the fuel tank 2 when the fuel supply cap 4 is opened. Further, the flowout of the evaporated fuel into atmospheric air can be prevented with the simple structure which makes use of an operation to open the key cover 19. Therefore, the evaporated fuel treatment device 1 exhibits excellent convenience and is preferably applicable to a miniaturized/small vehicle. Further, during traveling or the like, the fuel tank 2 can be maintained in a sealed state by the positive pressure adjusting valve 27 and the negative pressure adjusting valve 26 until the fuel tank 2 reaches a predetermined pressure. Therefore, an amount of evaporated fuel fed to the evaporated fuel storage unit 6 can be reduced.

Second Embodiment

Next, a second embodiment of the present invention is explained. This embodiment differs from the first embodiment with respect to the constitution of a diaphragm 45. Constitutional elements of this embodiment substantially the same as the corresponding constitutional elements of the first embodiment are designated with the same symbols, and the explanation of these elements is omitted.

Figure 6:
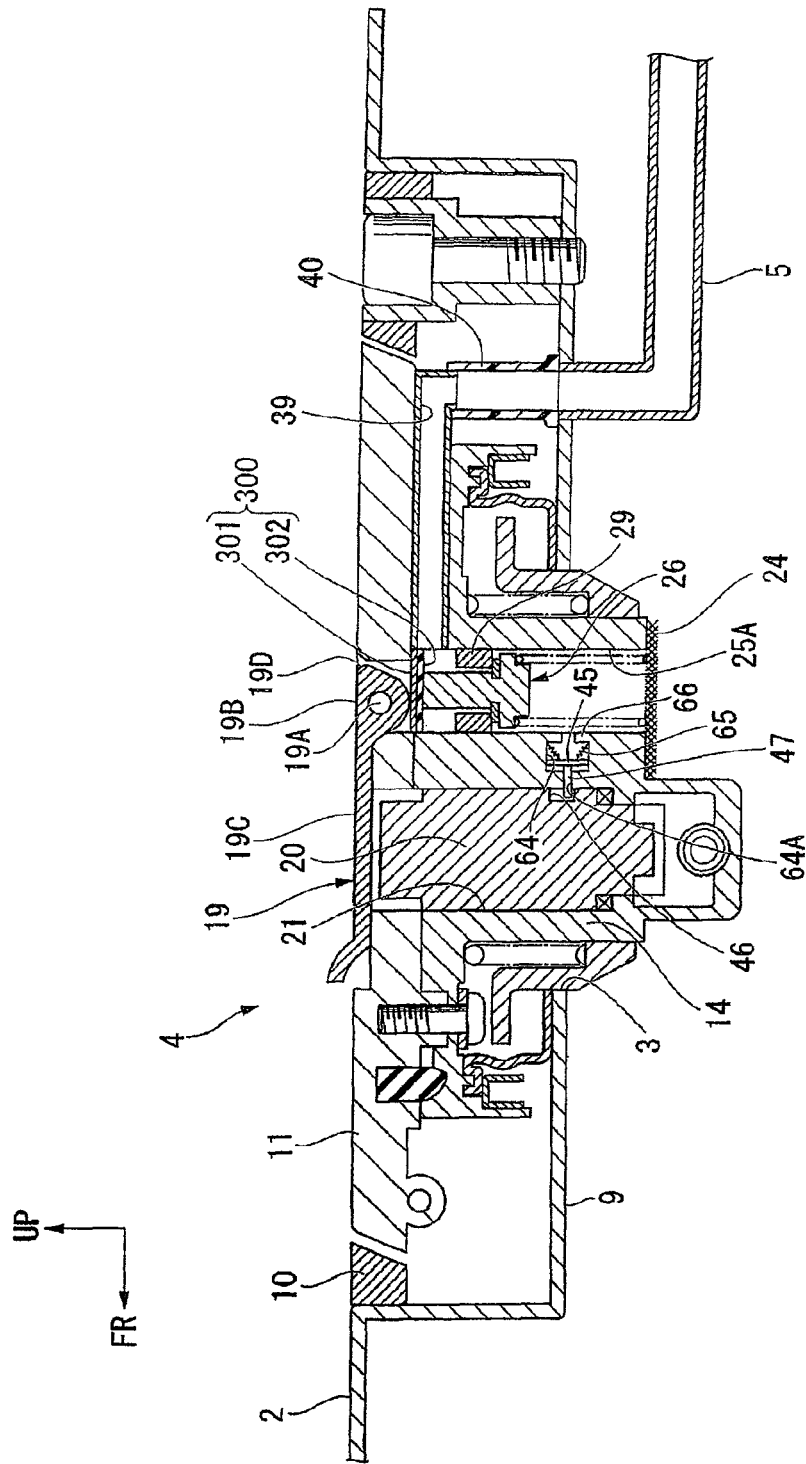
FIG. 6 is a cross-sectional view of a fuel supply cap of an evaporated fuel treatment device according to a second embodiment of the present invention of the present invention.

As shown in FIG. 6, in this embodiment, in the same manner as the first embodiment, a diaphragm chamber 64 extending over a key cylinder 20 and the cylindrical portion 25A is formed in the tumbler 14. The diaphragm chamber 64 is formed such that the diaphragm chamber 64 is indented toward the key cylinder 20 side from the fuel tank 2 inner side of the cylindrical portion 25A partitioned by the negative pressure adjusting valve 26, and the diaphragm chamber 64 has a communication passage 64A penetrating into the cylinder chamber 21 so that the diaphragm chamber 64 is communicated with the cylinder chamber 21. In the inside of the diaphragm chamber 64 on the fuel tank 2 side, a biasing member 65 is housed. The biasing member 65 biases the diaphragm 45 in the direction, along which the engaging pin 47 is engaged with the engaging groove 46 against an atmospheric pressure on the communication passage 44A side. The biasing member 65 has one end thereof supported on a projecting member 66 formed on an edge portion of the diaphragm chamber 64 on the fuel tank 2 side.

In this embodiment, when an inner pressure in the fuel tank 2 is high, the diaphragm 45 receives a tank inner pressure, and the engaging pin 47 is engaged with the engaging groove 46 by being biased by the biasing member 48, thereby restricting the rotation of the key cylinder 20. On the other hand, when the inner pressure in the fuel tank 2 is lowered and becomes below an atmospheric pressure on the communication passage 44A side, the diaphragm 45 is displaced against a biasing force of the biasing member 48. Therefore, the engagement between the engaging pin 47 and the engaging groove 46 is released such that the rotation of the key cylinder 20 is allowed.

Although the first and second embodiments of the present invention have been explained, the present invention is not limited to the above-mentioned embodiments. For example, in the above-mentioned first and second embodiments of the present invention, the constitution where inner pressure in the fuel tank 2 is released by opening the negative pressure adjusting valve 26 has been explained. However, advantageous effects substantially equal to the advantageous effects of the present invention can be acquired also by the constitution where the positive pressure adjusting valve 27 is opened by the manipulation with the key cover.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An evaporated fuel treatment device for a vehicle comprising:
    a fuel tank for storing fuel;
    a fuel supply cap mounted on a fuel filling port of the fuel tank, the fuel supply cap being openable from and closeable to the fuel filling port by manipulation with a key inserted into a key cylinder;
    a key cover mounted on the fuel supply cap and covering a key hole of the key cylinder in an openable and closeable manner;
    an evaporated fuel storage unit storing evaporated fuel using an absorption agent;
    a charge passage allowing communication between the fuel tank and the evaporated fuel storage unit;
    a purge passage allowing communication between the evaporated fuel storage unit and an intake system of an internal combustion engine;
    a communication chamber formed in the fuel supply cap, the communication chamber allowing communication between the charge passage and an inside of the fuel tank;
    an open/close valve arranged in the communication chamber, the open/close valve being opened when an inner pressure in the fuel tank reaches a predetermined pressure such that the fuel tank and the evaporated fuel storage unit communicate with each other; and
    an interlocking member located between the key cover and the open/close valve, the interlocking member opening the open/close valve in an interlocking manner with an operation to open the key cover.

2. The evaporated fuel treatment device according to claim 1, wherein the open/close valve includes:
    a positive pressure adjusting valve, the positive pressure adjusting valve being opened when the inner pressure in the fuel tank becomes a first predetermined pressure or higher such that the evaporated fuel generated in the fuel tank is supplied to the evaporated fuel storage unit through the communication chamber and the charge passage; and
    a negative pressure adjusting valve, the negative pressure adjusting valve being opened when the inner pressure in the fuel tank becomes a second predetermined pressure or lower such that atmospheric air is supplied to the fuel tank from the evaporated fuel storage unit through the communication chamber and the charge passage,
    wherein the interlocking member is interlocked with either the positive pressure adjusting valve or the negative pressure adjusting valve.

3. The evaporated fuel treatment device according to claim 2, wherein the key cover includes:
    a proximal portion mounted on the fuel supply cap by a hinge in an openable/closeable manner; and
    a pushing portion formed on the proximal portion, the pushing portion pushing down the interlocking member when the key cover is opened so as to open the negative pressure adjusting valve.

4. The evaporated fuel treatment device according to claim 3, wherein the interlocking member includes:
    a pushing plate arranged directly below the pushing portion and having resiliency; and
    an elastic sheet located below the pushing plate,
    wherein the negative pressure adjusting valve is brought into contact with the elastic sheet.

5. The evaporated fuel treatment device according to claim 4, wherein the key cylinder is arranged at a center portion of the fuel supply cap, the positive pressure adjusting valve and the negative pressure adjusting valve are arranged parallel to each other along a circumference outside the key cylinder and in the radial direction of the key cylinder, the hinge mounted on the key cover extends over the positive pressure adjusting valve and the negative pressure adjusting valve, and the pushing portion is arranged only above the negative pressure adjusting valve and is not arranged above the positive pressure adjusting valve.

6. The evaporated fuel treatment device according to claim 5, wherein a key manipulation standby mechanism is arranged inside of the communication chamber, and the key manipulation standby mechanism detects a pressure difference between the inside and an outside the fuel tank and inhibits key manipulation of the key cylinder when the inner pressure of the fuel tank is higher than atmospheric pressure.

7. The evaporated fuel treatment device according to claim 4, wherein a key manipulation standby mechanism is arranged inside of the communication chamber, and the key manipulation standby mechanism detects a pressure difference between the inside and an outside the fuel tank and inhibits key manipulation of the key cylinder when the inner pressure of the fuel tank is higher than atmospheric pressure.

8. The evaporated fuel treatment device according to claim 3, wherein a key manipulation standby mechanism is arranged inside of the communication chamber, and the key manipulation standby mechanism detects a pressure difference between the inside and an outside the fuel tank and inhibits key manipulation of the key cylinder when the inner pressure of the fuel tank is higher than atmospheric pressure.

9. The evaporated fuel treatment device according to claim 2, wherein a key manipulation standby mechanism is arranged inside of the communication chamber, and the key manipulation standby mechanism detects a pressure difference between the inside and an outside the fuel tank and inhibits key manipulation of the key cylinder when the inner pressure of the fuel tank is higher than atmospheric pressure.

10. The evaporated fuel treatment device according to claim 1, wherein a key manipulation standby mechanism is arranged inside of the communication chamber, and the key manipulation standby mechanism detects a pressure difference between the inside and an outside the fuel tank and inhibits key manipulation of the key cylinder when the inner pressure of the fuel tank is higher than atmospheric pressure.

11. The evaporated fuel treatment device according to claim 10, further comprising a cylindrical tumbler mounted on a lower surface of a cap body of the fuel supply cap, wherein the key manipulation standby mechanism includes:
 a diaphragm chamber formed in the cylindrical tumbler, the diaphragm chamber allowing communication between the cylinder chamber and the communication chamber, the diaphragm chamber having a communication passage penetrating into the cylinder chamber so that the diaphragm chamber is communicated with the cylinder chamber;
 a diaphragm arranged inside the diaphragm chamber;
 an engaging groove on an outer peripheral surface of the key cylinder;
 an engaging pin joined to the diaphragm; and
 a biasing member inside the communication passage and against the diaphragm,
 wherein the engaging pin is located in the engaging groove when the inner pressure of the fuel tank is higher than atmospheric pressure, thereby inhibiting the key manipulation of the key cylinder.

12. The evaporated fuel treatment device according to claim 1, wherein a key manipulation standby mechanism is arranged inside of the communication chamber, and the key manipulation standby mechanism detects a pressure difference between the inside and an outside the fuel tank and inhibits key manipulation of the key cylinder when the inner pressure of the fuel tank is higher than atmospheric pressure.

13. The evaporated fuel treatment device according to claim 12, further comprising a cylindrical tumbler mounted on a lower surface of a cap body of the fuel supply cap, wherein the key manipulation standby mechanism includes:
 a diaphragm chamber formed in the cylindrical tumbler, the diaphragm chamber allowing communication between the cylinder chamber and the communication chamber, the diaphragm chamber having a communication passage penetrating into the cylinder chamber so that the diaphragm chamber is communicated with the cylinder chamber;
 a diaphragm arranged inside the diaphragm chamber;
 an engaging groove on an outer peripheral surface of the key cylinder;
 an engaging pin joined to the diaphragm; and
 a biasing member inside the communication passage and against the diaphragm,
 wherein the engaging pin is located in the engaging groove when the inner pressure of the fuel tank is higher than atmospheric pressure, thereby inhibiting the key manipulation of the key cylinder.

14. An evaporated fuel treatment device for a vehicle comprising:
 a fuel tank for storing fuel;
 a fuel supply cap openable from and closeable to a fuel filling port by manipulation with a key inserted into a key cylinder;
 a key cover mounted on the fuel supply cap and covering a key hole of the key cylinder;
 an evaporated fuel storage unit storing evaporated fuel;
 a charge passage allowing communication between the fuel tank and the evaporated fuel storage unit;
 a communication chamber formed in the fuel supply cap, the communication chamber allowing communication between the charge passage and an inside of the fuel tank;
 an open/close valve arranged in the communication chamber, the open/close valve being opened when an inner pressure in the fuel tank reaches a predetermined pressure such that the fuel tank and the evaporated fuel storage unit communicate with each other; and
 an interlocking member located between the key cover and the open/close valve, the interlocking member opening the open/close valve in an interlocking manner with an operation to open the key cover.

15. The evaporated fuel treatment device according to claim 14, wherein the open/close valve includes:
 a positive pressure adjusting valve, the positive pressure adjusting valve being opened when the inner pressure in the fuel tank becomes a first predetermined pressure or higher such that the evaporated fuel generated in the fuel tank is supplied to the evaporated fuel storage unit through the communication chamber and the charge passage; and
 a negative pressure adjusting valve, the negative pressure adjusting valve being opened when the inner pressure in the fuel tank becomes a second predetermined pressure or lower such that atmospheric air is supplied to the fuel tank from the evaporated fuel storage unit through the communication chamber and the charge passage,
 wherein the interlocking member is interlocked with either the positive pressure adjusting valve or the negative pressure adjusting valve.

16. The evaporated fuel treatment device according to claim 15, wherein the key cover includes:
 a proximal portion mounted on the fuel supply cap by a hinge in an openable/closeable manner; and
 a pushing portion formed on the proximal portion, the pushing portion pushing down the interlocking member when the key cover is opened so as to open the negative pressure adjusting valve.

17. The evaporated fuel treatment device according to claim 16, wherein the interlocking member includes:
 a pushing plate arranged directly below the pushing portion; and
 an elastic sheet located below the pushing plate,
 wherein the negative pressure adjusting valve is brought into contact with the elastic sheet.

18. The evaporated fuel treatment device according to claim 17, wherein the key cylinder is arranged at a center portion of the fuel supply cap, the positive pressure adjusting valve and the negative pressure adjusting valve are arranged parallel to each other along a circumference outside the key cylinder and in the radial direction of the key cylinder, the hinge mounted on the key cover extends over the positive pressure adjusting valve and the negative pressure adjusting valve, and the pushing portion is arranged only above the negative pressure adjusting valve and is not arranged above the positive pressure adjusting valve.

* * * * *